US00RE48611E

(19) United States
(12) Reissued Patent
Zins et al.

(10) Patent Number: US RE48,611 E
(45) Date of Reissued Patent: Jun. 29, 2021

(54) SEMIAUTOMATIC FIREARM

(71) Applicant: Cabot Intellectual Property Holdings, Sarver, PA (US)

(72) Inventors: Brian Zins, Girard, OH (US); Robert Bianchin, Butler, PA (US); Michael Hebor, Pittsburgh, PA (US)

(73) Assignee: CABOT INTELLECTUAL PROPERTY HOLDINGS, Sarver, PA (US)

(21) Appl. No.: 15/667,410

(22) Filed: Aug. 2, 2017

Related U.S. Patent Documents

Reissue of:
(64) Patent No.: 9,097,474
Issued: Aug. 4, 2015
Appl. No.: 13/869,918
Filed: Apr. 24, 2013

U.S. Applications:
(60) Provisional application No. 61/637,800, filed on Apr. 24, 2012.

(51) Int. Cl.
*F41A 5/02* (2006.01)
*F41A 5/04* (2006.01)
(Continued)

(52) U.S. Cl.
CPC ..... *F41A 5/04* (2013.01); *F41A 3/88* (2013.01); *F41A 5/02* (2013.01); *F41A 9/62* (2013.01);
(Continued)

(58) Field of Classification Search
None
See application file for complete search history.

(56) References Cited

U.S. PATENT DOCUMENTS 657,918 A * 9/1900 Copping et al. ..... F41A 17/38 42/7
1,563,675 A * 12/1925 Tansley ..... 89/128
(Continued)

FOREIGN PATENT DOCUMENTS

DE 3035796 A1 * 5/1982 ..... F41A 17/36
GB 282602 A * 12/1927
(Continued)

OTHER PUBLICATIONS

Translations for related foreign documents (Year: Various).*
(Continued)

*Primary Examiner* — Jeffrey R Jastrzab
(74) *Attorney, Agent, or Firm* — William F. Lang, IV; Lang Patent Law LLC

(57) ABSTRACT

A semiautomatic handgun includes various unique features to facilitate rapid, accurate shooting. Some examples of the handgun include a more compact recoil spring system, locating the recoil spring around the barrel while permitting rearward movement of the barrel in conjunction with the slide. Other examples include an automatic magazine release for releasing the magazine upon the discharge of the last cartridge in the magazine. Still other examples include a grooved or roughened top slide surface for facilitating slide manipulation with one hand. Further examples include auxiliary sight systems to facilitate determining the proper distance by which to lead a moving target. Other examples include a takedown tool stored within the handgun.

4 Claims, 14 Drawing Sheets

(51) Int. Cl.

| | |
|---|---|
| ***F41A 9/62*** | (2006.01) |
| ***F41A 9/65*** | (2006.01) |
| ***F41G 1/473*** | (2006.01) |
| ***F41A 3/88*** | (2006.01) |
| ***F41A 17/38*** | (2006.01) |
| *F41A 3/72* | (2006.01) |
| *F41C 23/10* | (2006.01) |

(52) U.S. Cl.
CPC ..... *F41A 9/65* (2013.01); *F41A 17/38* (2013.01); *F41G 1/473* (2013.01); *F41A 3/72* (2013.01); *F41C 23/10* (2013.01)

(56) References Cited

U.S. PATENT DOCUMENTS

| | | | | |
|---|---|---|---|---|
| 1,992,380 | A * | 2/1935 | Linder | F41A 17/38 42/18 |
| 2,115,041 | A * | 4/1938 | Obregon | 89/138 |
| 4,664,015 | A * | 5/1987 | Kennedy | F41A 9/59 89/138 |
| 5,113,603 | A * | 5/1992 | Buegel | 42/7 |
| 5,379,541 | A * | 1/1995 | Bammate | F41A 9/59 42/18 |
| 8,166,691 | B1 * | 5/2012 | Karfiol | 42/7 |
| 2005/0247187 | A1 * | 11/2005 | McGarry | 89/198 |
| 2011/0126441 | A1 * | 6/2011 | Vukovic | 42/70.02 |
| 2012/0085010 | A1 * | 4/2012 | Cook | 42/7 |

FOREIGN PATENT DOCUMENTS

| | | | |
|---|---|---|---|
| RU | 2433369 | C3 * | 11/2001 |
| RU | 2373475 | C2 * | 11/2009 |
| RU | 2596261 | C2 * | 9/2016 |
| SU | 32330 | A1 * | 9/1933 |

OTHER PUBLICATIONS

"ASP Pistol," World Guns, http://world.guns.ru/handguns/hg/usa/asp-e.html, as viewed on Apr. 10, 2012.

"Blowback (firearms)," Wikipedia, http://en.wikipedia.org/wiki/Blowback_%28firearms%29, as viewed on Apr. 24, 2013.

Glock Store website showing Glock disassembly tools, http://www.glockstore.com/maintenance/tools/disassembly-tools-for-glock, as viewed on Apr. 24, 2013.

Springfield Armory, Springfield M1 Garand Owner's Manual, 2001.

Operator's Manual for P7 Series Pistols, Heckler & Koch, 2007.

"ASP Pistol," World Guns, http://world.guns.ru/handguns/hg/usa/asp-e.html.

Fake advertisement for "Homeboy Nyte Sytes".

"Homeboy Sights for Rifles," Cheaper Than Dirt, Nov. 24, 2011, http://cheaperthandirt.com/blog/?p=14428.

Photographs of a dejamming tool consisting of a piece of bent wire, designed by Claude Werner, http://www.totalprotectioninteractive.com/forum/showthread.php?t=10326.

* cited by examiner

SEMIAUTOMATIC FIREARM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application claims the benefit of U.S. provisional patent application No. 61/637,800, which was filed on Apr. 24, 2012, and entitled "Semiautomatic Firearm."

TECHNICAL FIELD

The present invention relates to semiautomatic firearms. More specifically, a semiautomatic firearm having unique features to facilitate fast, accurate shooting is provided.

BACKGROUND INFORMATION

Semiautomatic firearms have been in use for over a century, and are popular for military, law enforcement, defensive, and sporting purposes. A semiautomatic firearm utilizes a reciprocating bolt or slide. Retraction of the slide upon discharging the weapon ejects the spent casing from the chamber. The slide then returns forward under spring pressure, carrying a fresh cartridge from the magazine into the chamber. The frame of a semiautomatic handgun typically includes an ejector for pushing the spent casing out of an ejection port in a predetermined direction. The slide typically includes a spring biased extractor having a hook for engaging the rim of a casing, permitting the casing to be extracted from the chamber in the absence of discharging a firearm.

It is necessary to control the retraction of the slide so that the slide does not retract a significant distance before the bullet exits the muzzle. While the bullet is being propelled forward within the barrel, gas pressure within the barrel is quite high. Excessive retraction of the slide at this time would direct at least some of this high gas pressure in undesirable directions, potentially endangering the shooter. Various mechanisms have been developed toward this end.

The simplest method of controlling slide retraction, commonly known as straight blowback, simply relies on gas pressure inside the casing to retract the slide. The mass of the slide, as well as the strength of the recoil spring, are selected so that the slide does not travel rearward a significant distance before the bullet exits the muzzle. This system is commonly used with small caliber semiautomatic handguns, up to and including 0.380 ACP. Because the barrel of such handguns is fixed, some handguns utilizing the system utilize a recoil spring that is coiled around the barrel, so that the barrel effectively serves as a recoil spring guide. Due to the increasing slide mass and recoil spring strength required with increasing pressure levels, this system is typically not utilized for handguns of 9×19 mm. caliber or higher calibers.

With increasing pressure levels, other mechanisms are necessary to ensure that significant slide retraction does not occur before the bullet leaves the muzzle, ensuring that gas pressure within the barrel has dropped to a safe level. A tilting barrel system is commonly used for this purpose. In such systems, the barrel is locked to the slide by either a projection that fits within the ejection port of the slide, or by a plurality of locking lugs that engage corresponding locking lugs on the interior of the slide. As the slide retracts, the barrel moves rearward with the slide for a short distance, before a pivoting link or lug on the bottom of the barrel causes the breech end of the barrel to pivot downward, disengaging with the slide, and allowing the slide to continue to retract independently. All such systems which are known to be present inventors utilize a recoil spring assembly that is adjacent to the barrel, thereby occupying additional space that could otherwise be occupied by additional devices.

Another means of ensuring that the barrel and slide do not disengage prematurely is a gas retarded blowback system, such as that used within the Heckler & Koch P7 pistol. This system is similar to a straight blowback design, but utilizes a vent within the barrel to direct gas into a cylinder that contains a piston. When the pistol is discharged, the piston applies forward pressure to the slide until the bullet exits the muzzle, thereby resisting premature slide retraction. This mechanism results in reduced felt recoil, contributing to the accuracy with which the firearm may be shot. This mechanism also permits the recoil spring to be coiled around the barrel. However, this system is difficult to manufacture, and can in some instances result in excessive heat buildup within the firearm.

Other systems for controlling the movement of the slide include the falling locking block design of the Beretta 92F pistol, which provides for in-line movement of the barrel. This in-line barrel movement enhances the accuracy of the pistol. However, the locking block is subject to wear. The recoil spring of this pistol is located underneath the barrel, thereby adding bulk to the overall design.

Accordingly, there is a need for a system that controls the movement of the slide with respect to the barrel, wherein the recoil spring is coiled around the barrel, and avoiding the disadvantages of gas retarded blowback designs. Such a system would reduce the weight and bulk of the firearm, particularly when lights, laser aiming devices, or other accessories are secured to the dust cover of the frame, located in front of the trigger guard and below the barrel.

Sighting systems for handguns generally fall within two types. Iron sights typically consist of a post adjacent to the muzzle, which is aligned with a rear sight in the form of a U-shaped notch, V-shaped groove, or aperture. Iron sights may in some instances include various features to improve visibility, such as coloring, dots, fiber optic inserts, and/or tritium inserts. Iron sights are simple, generally durable, and compact. However, they often provide no indication of the proper lead for hitting a moving target.

Optical sighting systems, such as those using illuminated dot reticles, display an illuminated dot or other shape that is placed over the target when looking through the sight. Some optical sights provide a means of estimating lead for hitting moving targets. However, such sights add bulk and weight to a firearm. Particularly in the case of a handgun, such sights can increase the difficulty of carrying the handgun, particularly if concealment is important. Furthermore, such sights are often dependent upon batteries or other illumination means such as tritium. In the case of iron sights, if the tritium inserts go dim, the iron sights themselves are still useful. However, in the event of a battery powered or tritium powered optical sight, if the battery dies or the tritium goes dim, the sight is significantly less useful.

Accordingly, there is a need for a sighting system that combines the simplicity, ruggedness, and compactness of iron sights with a means of estimating lead when shooting at a moving target. Moving targets are common in both sporting and practical shooting applications, making a means of lead estimation particularly useful.

Many shooting situations in both sporting and practical contexts require the ability to manipulate the firearm with only one hand, including not only aiming and trigger squeeze, but also reloading and malfunction clearance. Reloading and clearing a malfunction require the ability to manipulate the slide. When working with only one hand, for example, in the case of a real or simulated injury, a portion of the slide such as the rear sight, ejection port, or muzzle portion of the slide is generally engaged with the shooters belt, the heal of the shooters shoe, or a convenient nearby hard surface.

However, many presently available handguns do not include a convenient projection on the slide for use during one-handed slide retraction. While some rear sights include a vertical forward surface that is useful for engaging convenient objects to retract the slide, many popular rear sights include a sloped forward surface, making the rear sight difficult to hook. Furthermore, although some ejection ports, such as those on a 1911 handgun, are easy to engage, ejection ports that lock up with the barrel by receiving a portion of the barrel have little excess material for engaging convenient objects to retract the slide. Many handguns are not suited for slide retraction by pushing the muzzle end of the slide against a convenient object, and this method of slide retraction is typically only practiced with full-size 1911 handguns without full-length guide rods. While it is known to include an additional projection within the slide to aid in one hand manipulation, the very few presently available projections would limit the selection of compatible sights, as well as interfere with some older methods of malfunction clearance, such as wiping the hand across the top of the slide to clear a stovepipe malfunction.

Some users attempt to overcome the above-described deficiency by applying skateboard tape to the top of the slide. The application of skateboard tape results in cosmetic disadvantages, as well as the potential for the tape to wear or to lose adhesion.

Accordingly, there is a need for a handgun slide having a means of engaging a convenient surface to facilitate one-handed slide retraction without interfering with the selection of sights or with the user's preferred method of malfunction clearance.

Presently available semiautomatic handguns utilize a detachable box magazine that is held in place in one of two ways. The most common method is a catch engaging a hole defined within the body of the magazine. The catch is released utilizing a button that is reciprocally secured within the frame of the handgun, behind and slightly below the trigger guard, for actuation with the user's thumb. The design of the magazine release must balance the ease with which the magazine can be released intentionally with the need to avoid releasing the magazine unintentionally. These needs are typically balanced by the size of the magazine release button, the strength of the magazine release spring, and/or the placement of the magazine release button. Often, the magazine release button is placed so that slight rotation of the handgun within the user's hand is required to engage the magazine release with the shooter's thumb and release the magazine. Although this location minimizes the likelihood of accidental magazine release, it also slows the speed of reloading. Other presently available handguns utilize a magazine catch located at the base of the grip, sitting underneath the bottom of the magazine. Although this style of magazine catch is generally more secure, it is much slower to reload, and can make malfunction clearance significantly more difficult.

In the field of semiautomatic rifles, it is known to automatically eject a stripper clip from an M1 Garand rifle upon firing the last round within the magazine. However, the present inventors are unaware of any prior means of automatically releasing a box magazine from a semiautomatic firearm upon firing the last round within the magazine. Such a feature would significantly speed reloading not only by avoiding the need to depress the magazine release, but also by avoiding the need to shift the user's grip. The user would simply be able to focus on grasping and inserting the fresh magazine, and chambering the next cartridge.

Shooters involved in stressful situations, whether competition or life and death struggles, have been known to lose count of the number of cartridges remaining within their magazine. With most semiautomatic firearms, determining the number of cartridges remaining in a magazine requires removal of the magazine, which may be undesirable depending on the anticipated immediacy with which the firearm may be needed. At least one semiautomatic handgun, known as the ASP, attempted to address this need with transparent grip panels, permitting the shooter to determine the number of cartridges remaining by looking at the side of the pistol. However, in poor light conditions, determining the number of cartridges remaining is still potentially difficult. Accordingly, a means of determining the number of cartridges remaining within a magazine, even in poor light, is desired.

SUMMARY

The above needs are met by various examples of semiautomatic handguns according to the present invention. One example of the semiautomatic handgun includes a recoil spring that is coiled around the barrel, along with a barrel that is structured to move rearward with the slide for a predetermined distance. Upon moving for the predetermined distance, the barrel disengages from the slide, permitting the breech face of the slide to separate from the chamber.

Another example of the semiautomatic handgun utilizes a magazine release that automatically releases the magazine from the handgun upon the discharge of the last cartridge in the magazine.

Another example of the semiautomatic handgun includes a slide having a grooved or roughened portion of its top surface to facilitate manipulation of the slide with one hand.

Yet another example of the semiautomatic handgun includes a sight system along the side of the handgun. This sight system is intended to facilitate estimating the correct distance by which to lead a moving target.

A further example of the semiautomatic handgun includes a magazine having a visibility indicator secured to the follower, and a slot defined within the side of the magazine so that the visibility indicator may be viewed. The grip of the semiautomatic handgun has a slot defined therein, corresponding to the slot within the side of the magazine. The visibility indicator within the magazine follower may therefore be viewed by the shooter to gain an approximate idea of the number of cartridges remaining in the magazine.

These and other aspects of the various embodiments of the semiautomatic firearm will become more apparent through the following description and drawings.

BRIEF DESCRIPTION OF THE DRAWINGS

Like reference characters denote like elements throughout the drawings.

DETAILED DESCRIPTION

Figure 1:
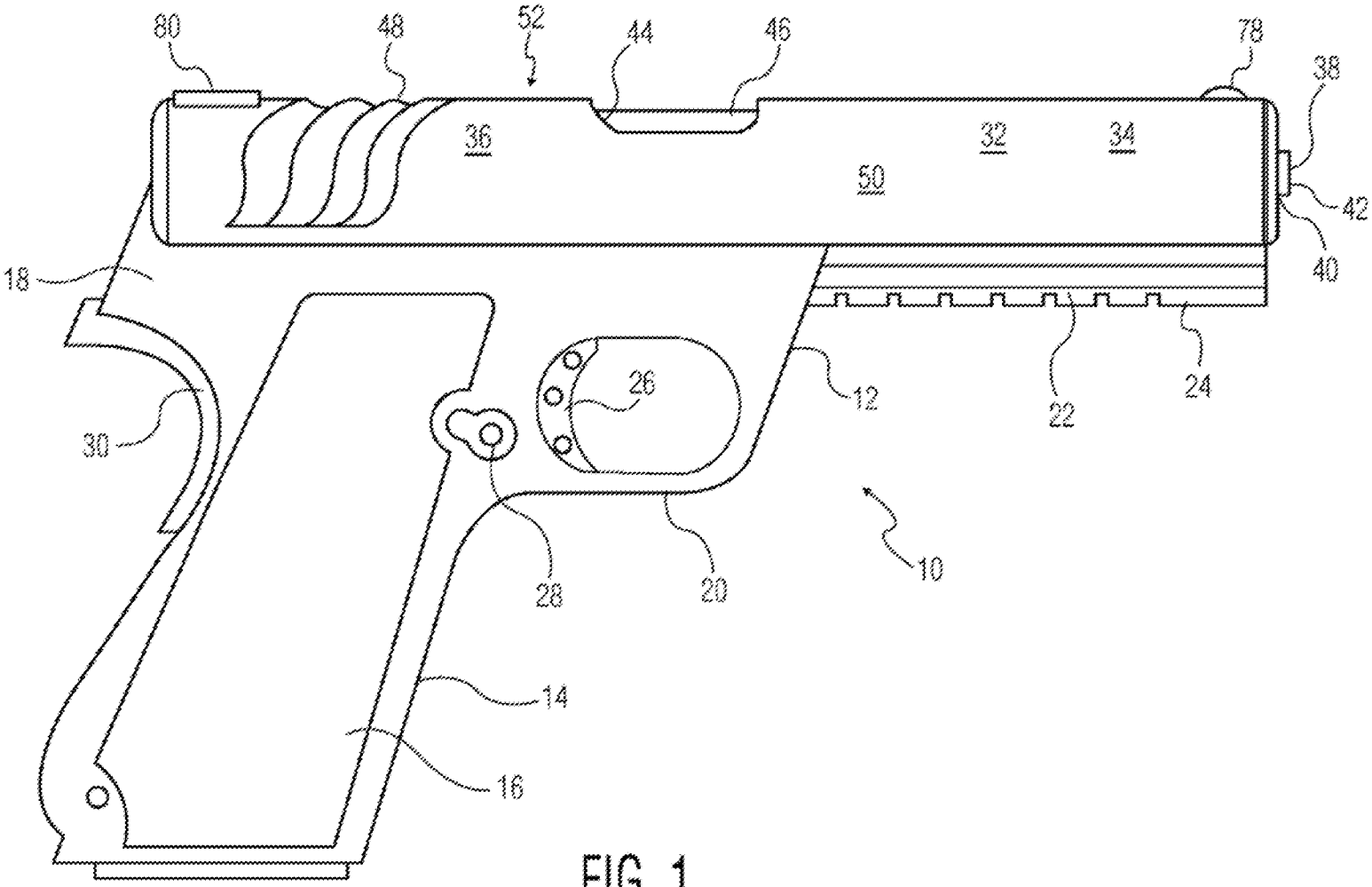
FIG. 1 is a right side elevational view of a semiautomatic handgun.

As used herein, terms such as "upper," "lower," "above," "below," etc. are used for convenience only, and refer to the normal orientation of the components. Such terms are not intended to be limiting with respect to components that may be oriented in different orientations. Referring to FIG. 1, an example of a semiautomatic handgun 10 is illustrated. The handgun 10 includes a frame 12 that houses the action, in a manner that is well understood to those skilled in the art. The frame 12 includes a grip portion 14, which in some examples may have a pair of grip panels 16 removably secured thereto. In the drawings, only the right side grip panel 16 is illustrated, with the left side grip panel being essentially a mirror image. The frame 12 includes an action housing portion 18 at the top and of the grip portion 14, and a trigger guard 20 in front of the action housing portion 18. The top portion of the frame 12 includes a pair of slide rails (not shown, but well understood to those skilled in the art) for receiving a reciprocating slide (described below). The forward portion of the frame 12 includes a dust cover 22 which, in the illustrated example, includes a universal rail 24, such as a Picatinny rail or other commonly used rail, for mounting various accessories such as lights and/or lasers. A trigger 26 is reciprocally mounted towards the rear of the trigger guard 20, and is biased towards a forward position, in a manner that is well understood to those skilled in the art. Similarly, a magazine release 28 is reciprocally mounted within the frame 12 behind the trigger guard 20, and is biased towards the left side of the frame 12, in a manner that is well known to those skilled in the art. A grip safety 30 may optionally be included in the upper rear portion of the grip portion 14 of the frame 12. As understood by those skilled in the art, the grip safety 30 is biased towards a rearward position, and resists rearward movement of the trigger 26 until the grip safety 30 is pushed forward by the shooter's grip. Depending on the specific action type of the semiautomatic handgun 10, the frame 12 may further include a slide stop, a manual thumb safety, and/or a decocking lever, all of which are well understood to those skilled in the art. Also depending on the specific action type, the upper rear portion of the frame 12 may include a hammer, which is well known to those skilled in the art.

The handgun 10 also includes a slide 32 that includes a pair of rails that correspond to the slide rails of the frame 12. The slide is reciprocally mounted on the slide rails in a manner that is well known to those skilled in the art. The slide 32 includes a forward portion 34 and a rear portion 36. The forward portion 34 surrounds the barrel 38, and defines a muzzle opening 40 supporting the muzzle end 42 of the barrel 38, and an ejection port 44 adjacent to the chamber portion 46 of the barrel 38. The rear portion 36 contains, depending on the type of action, either a striker or a firing pin, both of which are well understood to those skilled in the art. The rear portion 36 also includes an extractor, which may either be internal or external, and which is well understood to those skilled in the art.

The rear portion 36 includes grasping grooves 48 to provide traction between a user's hand and the slide during retraction of the slide. The unique grasping grooves 48 illustrated in FIG. 1 are located not only along the sides 50 of the slide 32, but also across the top 52 of the slide 32. Although grasping grooves are used in the illustrated example, checkering or other surface roughening may alternatively be used. This configuration of grasping grooves 48 is particularly useful in the event that the user must retract the slide with only one hand, either because of an injury or as may be required during a training exercise or a stage in a competition. The user may engage the grasping grooves 48 disposed on the top 52 of the slide 32 utilizing the shooter's belt, the heal of the shooter's shoe, or any physical structure which may be conveniently located at the time that the slide must be retracted. The shooter, whose hand will be wrapped around the grip frame 14, may then push forward on the grip frame 14 while maintaining the engagement of the grasping grooves 48 with whatever reasonably fixed surface may have been convenient at the time, thereby causing the slide 32 to move rearward relative to the frame 12. This unique configuration of grasping grooves 48 therefore provides a means of retracting the slide with only one hand, without placing any restrictions on the style of rear sight (discussed below) selected, and without placing a structure on the slide 32 that could potentially interfere with reholstering the handgun 10. Furthermore, if the shooter prefers to clear "stovepipe" malfunctions (in which a spent shell casing is trapped between the barrel 38 and slide 32, within the ejection port 44) by wiping a hand across the top 48 of the slide, the grooves 48 will not interfere with this action.

Figure 2:
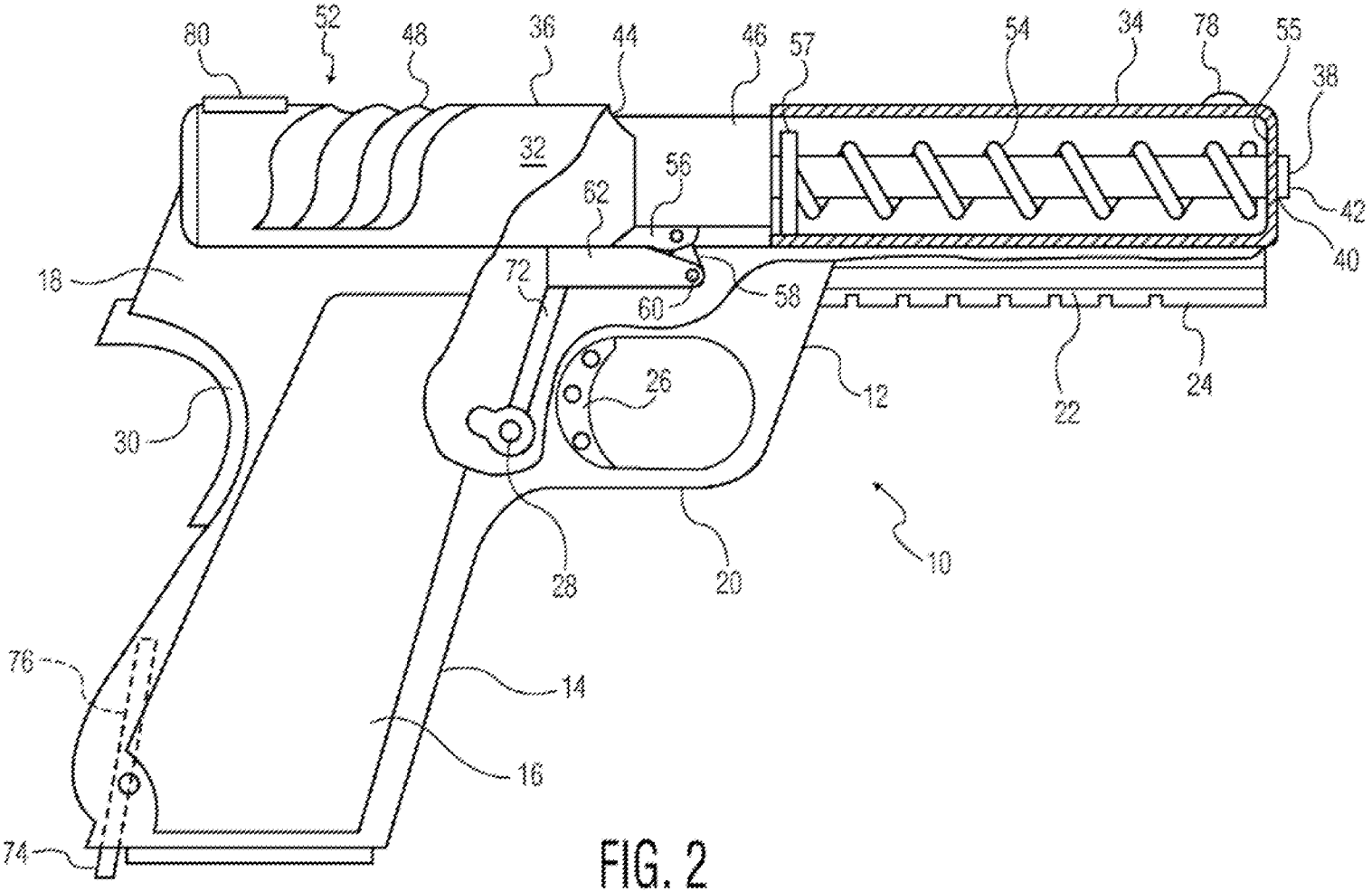
FIG. 2 is a partially cutaway right side elevational view of a semiautomatic handgun.
Figure 3:
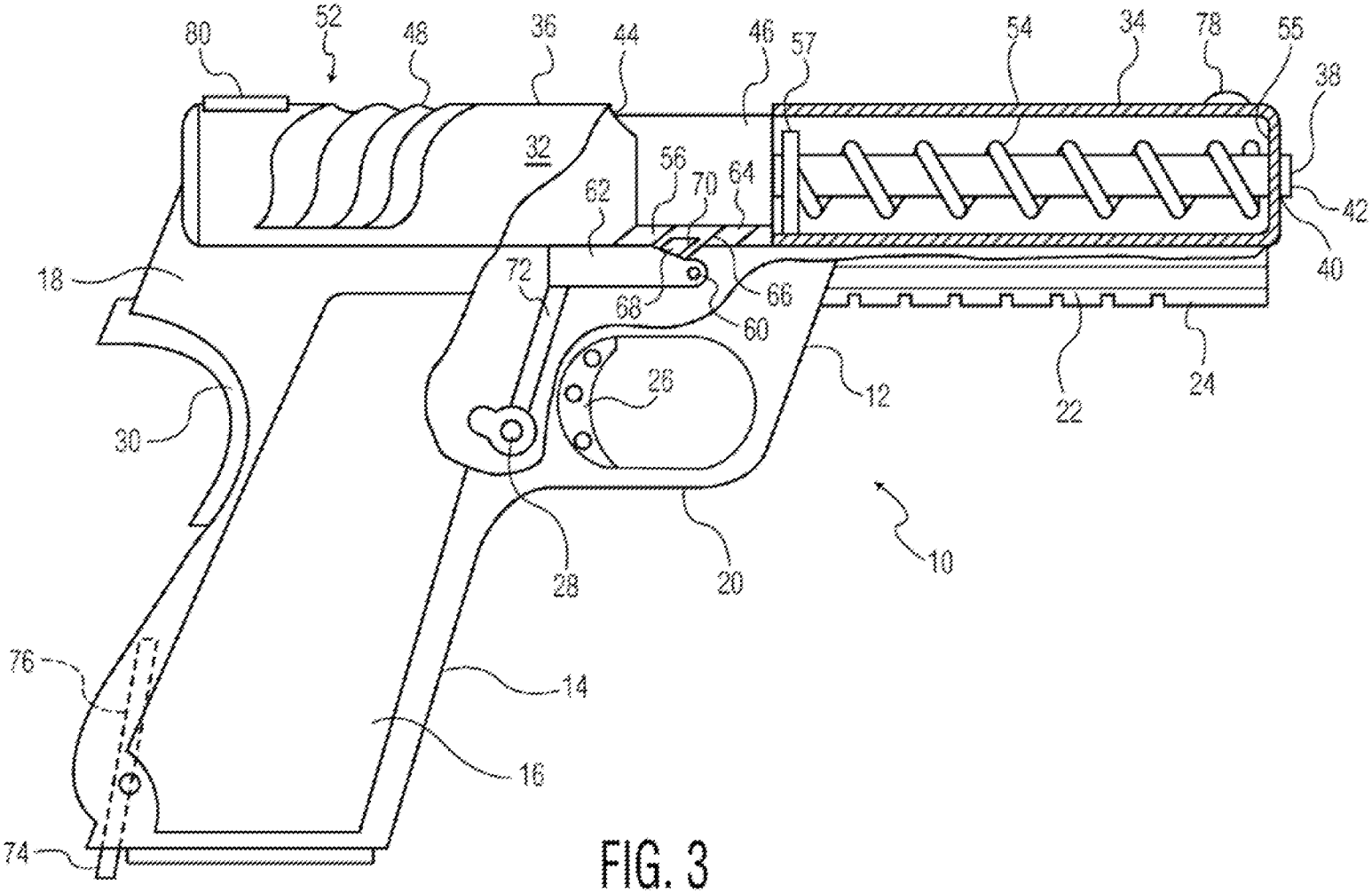
FIG. 3 is a partially cutaway right side elevational view of a semiautomatic handgun.

Referring to FIGS. 2-3, additional details of the barrel 38, slide 32, and recoil spring 54 are shown. The recoil spring 54 is coiled around the barrel 38, abutting a front 55 of the slide 32 at one end, and abutting a spring stop 57 secured to the frame 12 at its other end. The recoil spring 54 thereby utilizes the barrel 38 as a recoil spring guide rod instead of having a separate recoil spring guide rod below the barrel. This design reduces the weight of the handgun 10, and also permits the dust cover 22 and rail 24 to be disposed higher on the handgun 10. However, unlike previous designs which utilize a recoil spring coiled around the barrel, the handgun 10 utilizes a tilting barrel mechanism in order to ensure that the slide 32 and barrel 38 do not separate until a bullet has exited the muzzle 42. Although the illustrated example of a handgun 10 utilizes a chamber and 46 of the barrel 38 that fits within the ejection port 44 in order to ensure that the barrel 38 and slide 32 move rearward together, interconnecting barrel and slide lugs such as those used on 1911 style pistols may also be used.

In the example of FIG. 2, the barrel 38 includes at least one lug 56 extending below the chamber portion 46. A link 58 is pivotally secured between the lug 56 and the frame 12. In the illustrated example, the link 58 is pivotally secured to the frame by a pin 60 formed as a part of the slide stop 62, in a manner that is commonly used on 1911 style pistols. In this example, when the handgun 10 is fired, the link 58 permits the barrel 38 to travel rearward a short distance with the slide 32, before pulling the barrel 38 downward and out of engagement with the slide 32.

In the example of FIG. 3, the chamber portion 46 of the barrel 38 includes a downwardly depending lug 64 having an angled rear surface 66. The frame 12 includes a corresponding engagement 68, having a similarly angled forward surface 70. When the handgun 10 is discharged, the barrel 38 and slide 32 again move rearward together, until the surface 66 of the lug 64 comes in contact with the surface 70 of the lug 68. At this point, the mating surfaces 66, 70 guide the barrel 38 downward out of engagement with the slide 32, permitting the slide 32 to travel rearward without the barrel 38. Although a tilt barrel mechanism is illustrated, the use of a spring stop 57 as described above will allow the use of a falling locking block mechanism. In each case, the recoil spring 54 will provide appropriate resistance to rearward movement of the barrel and slide, both before and after disengagement of the barrel and slide.

Figure 6:
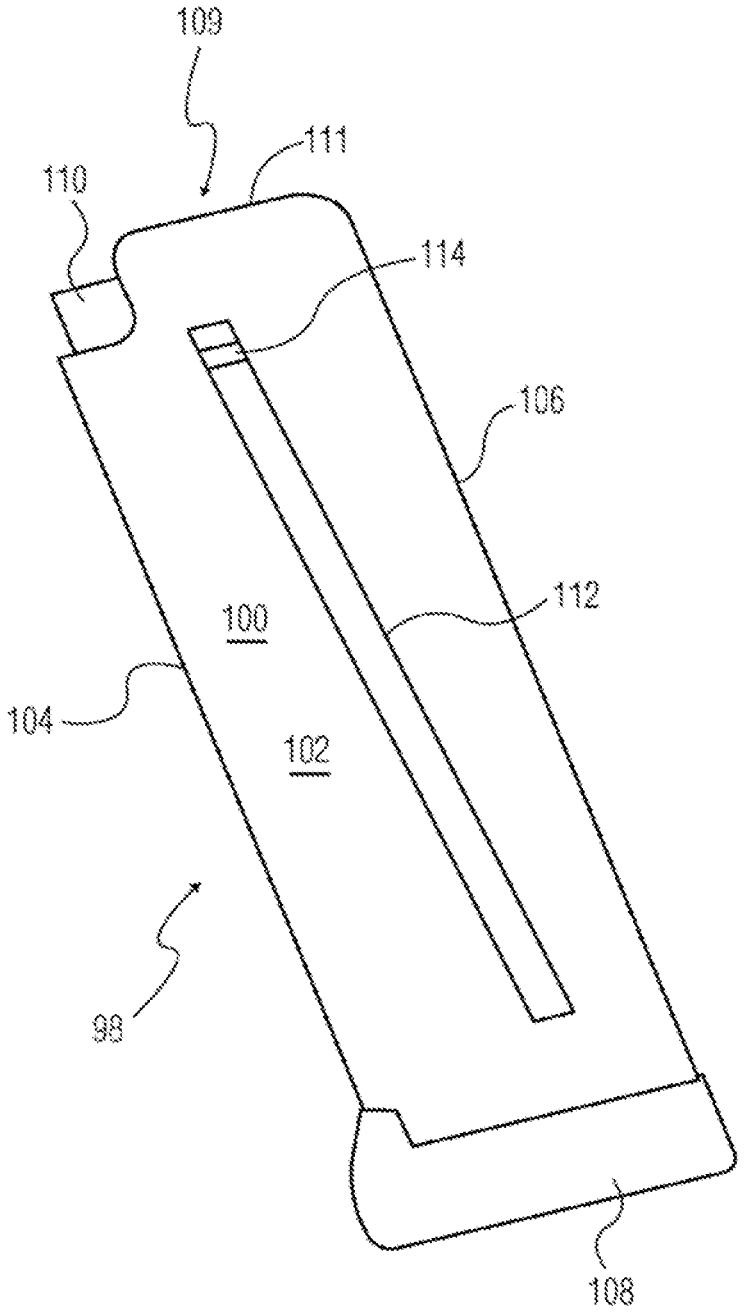
FIG. 6 is a left side elevational view of a magazine for a semiautomatic handgun.
Figure 7:
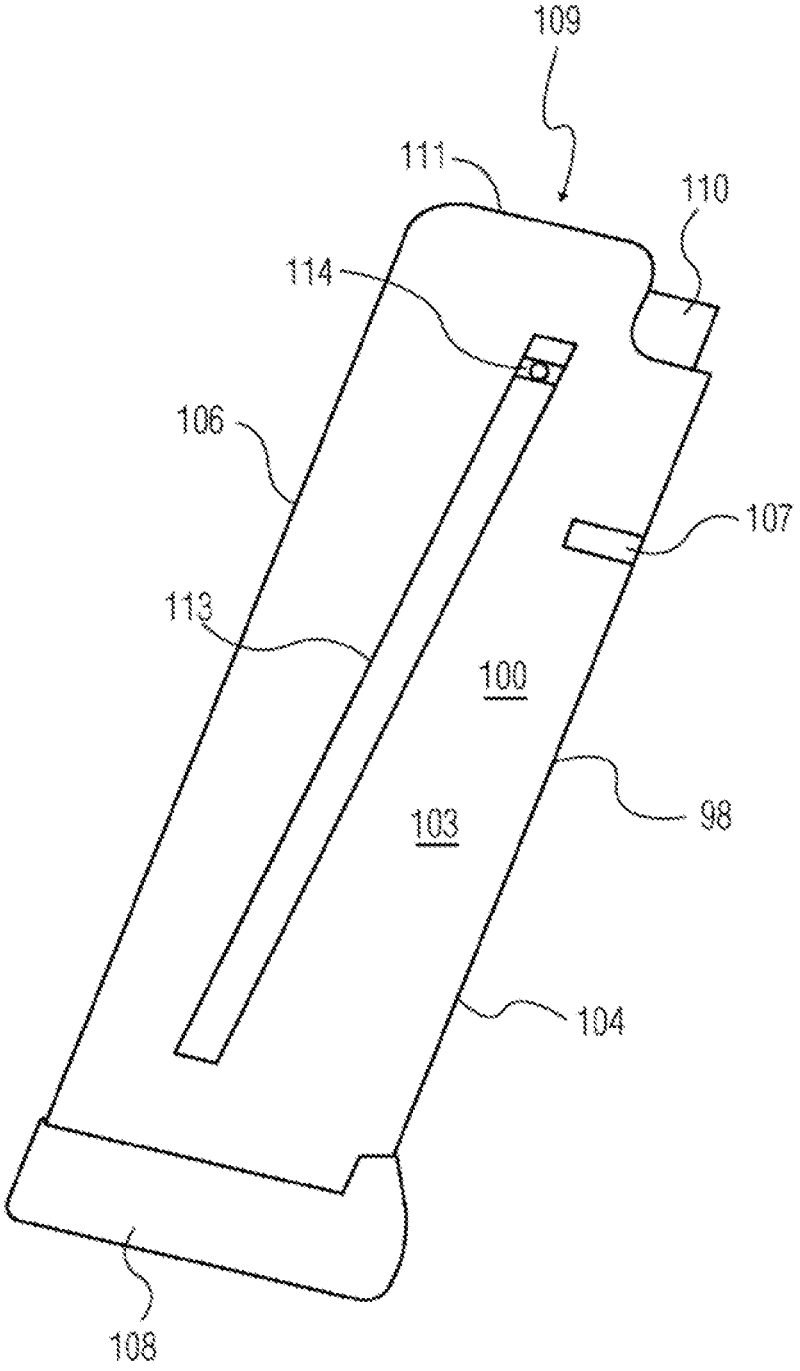
FIG. 7 is a right side elevational view of a magazine for a semiautomatic handgun.

Referring to FIG. 6-7, an improved magazine 98 is illustrated. The magazine 98 functions much like standard magazines, having a generally tubular body 100 that is closed at its lower end (by a removable baseplate 108 in the illustrated example), and open at its upper end. The upper end 109 includes a pair of feed lips 111 that are structured to hold cartridges within the magazine 98, as well as to assist in guiding cartridges into the chamber of the barrel. A follower 110 is slidably secured within the body, and is biased upward by a spring (not shown, and well known to those skilled in the art) disposed between the follower and the closed lower end. A hole 107 is defined within one side of the body for engaging the magazine release 28.

The improved magazine 98 includes a means for providing a shooter with information about the approximate number of cartridges remaining in a magazine. A magazine 98 is illustrated in FIGS. 6-7. The magazine body 100 defines a pair of side walls, with the left side wall 102 visible in FIG. 6, and the right side wall 103 being shown in FIG. 7. The magazine body 100 further includes a front wall 104 and back wall 106. A follower 110 is reciprocally secured within the body 100, and is biased upward by a spring (not shown, but well understood to those skilled in the art. A slot 112 is defined within the left side wall 102, and a slot 113 is defined within the corresponding right side wall 103. The follower 110 includes a visibility element 114 that is structured to be visible through the slots 112, 113. The visibility element 114 may be a polished metal surface such as that shown in FIG. 6, or a tritium filled insert as shown in FIG. 7.

Figure 8:
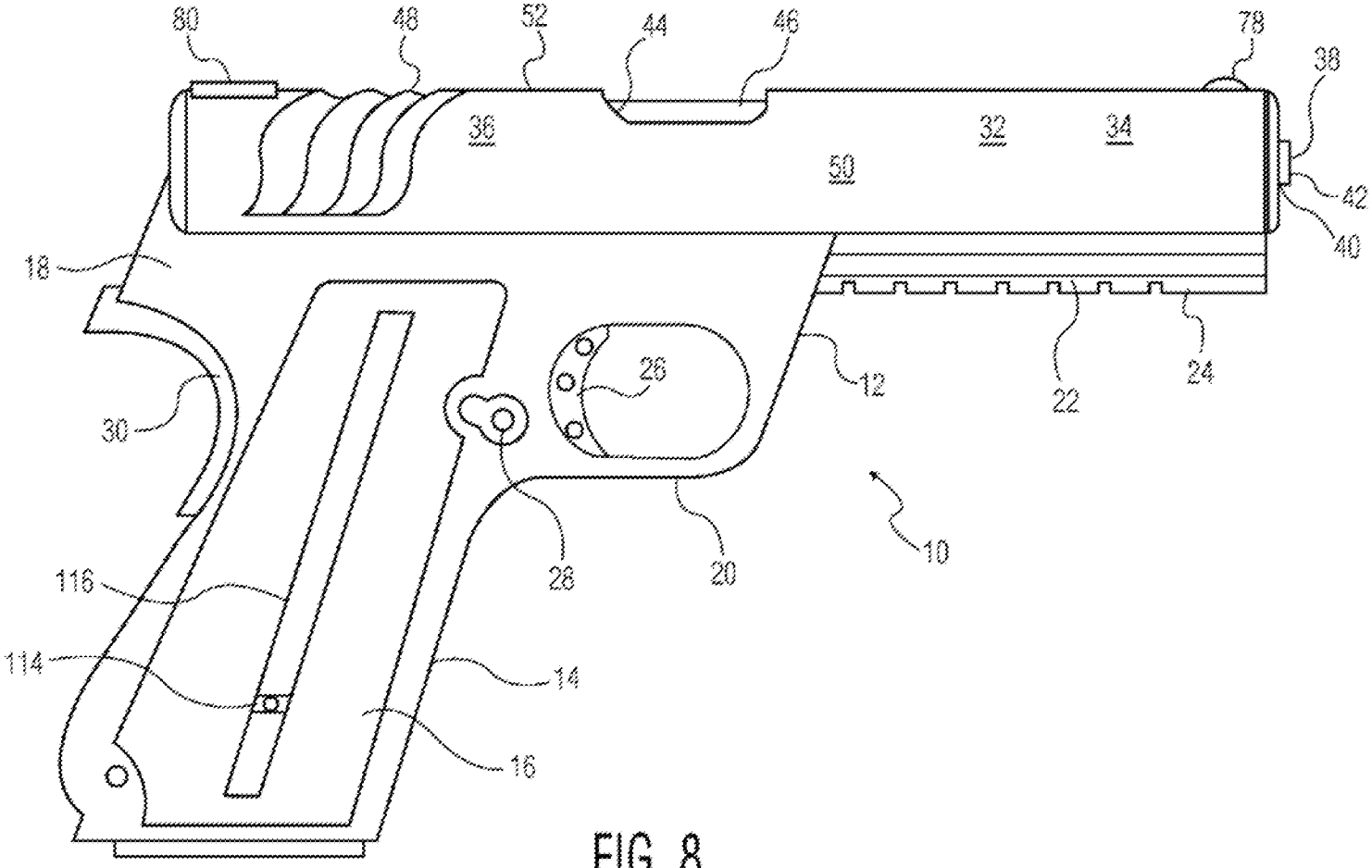
FIG. 8 is a right side elevational view of a semiautomatic handgun.

Referring to FIG. 8, each of the grip panel 16 includes a means for viewing the slot 112 or 113. In the illustrated example, a slot 116 is provided within the grip panel 16, corresponding to the slots 112 or 113 of the magazine 98. The slot 116 may be empty, or may include a transparent or translucent panel therein, made from polycarbonate, acrylic, or other suitable plastic. Alternatively, the grip panels 16 may be made from transparent or translucent plastic. A shooter viewing the side of the grip portion 14 of the frame 12 will be able to observe the position of the visibility element 114 within the magazine follower 110, and will thereby learn the approximate position of the follower 110 within the magazine 98. If the follower 110 is relatively high within the magazine 98, the shooter will know to plan to reload soon. Conversely, if the follower 110 is relatively low within the magazine 98, as illustrated in FIG. 8, the shooter will know that reloading is not necessary. Particularly in the case of a tritium insert, the visibility element 114 permits the shooter to learn the approximate number of cartridges within the magazine 98 in poor light conditions.

Referring to FIGS. 2-3 and 9-15, a mechanism for automatically ejecting a magazine after the last round in the magazine is fired is illustrated. Most presently available semiautomatic handguns include a slide stop [64] *62* that is structured to engage the follower within the magazine after the last cartridge within the magazine is loaded into the chamber. When the handgun is discharged and the slide moves rearward, upward pressure created by the magazine spring on the follower pushes the slide stop [64] *62* upward, into the path of the slide 32 as the slide 32 returns forward under pressure from the recoil spring 54. When the slide 32 engages the slide stop 62, further forward movement of the slide 32 is resisted by the slide stop 62.

In some examples of the handgun 10, an automatic release mechanism 72 is operatively connected to the magazine release 28. The automatic release mechanism 72 either operates in conjunction with the slide stop 62, or may include a completely separate mechanism. When the last cartridge within the magazine is loaded into the chamber and is discharged, either the upward pressure of the magazine spring and/or the reciprocating motion of the slide 32 may be utilized to actuate the magazine release 28, causing the empty magazine to automatically drop free from the handgun 10. The shooter therefore does not need to worry about engaging the magazine release 28, and needs only to focus on grabbing a fresh magazine, inserting the fresh magazine into the handgun 10, and chambering the first cartridge from the fresh magazine. Once the magazine release is actuated, the magazine release mechanism is disengaged until the next magazine is emptied, so that a new magazine may be inserted and retained by the magazine release.

In some examples of the handgun 10, the automatic magazine release mechanism may be selectively engaged or disengaged by the shooter. The mechanism may be disengaged by locking the mechanism components into place, and/or by disengaging the operative connection with either the slide stop and/or with the magazine release. A shooter competing in a competition having rules against the use of an automatic magazine release, or a soldier operating well away from sources of supplies who may wish to retain magazines, therefore has the option of either utilizing or disengaging the automatic magazine release mechanism.

Figure 9:
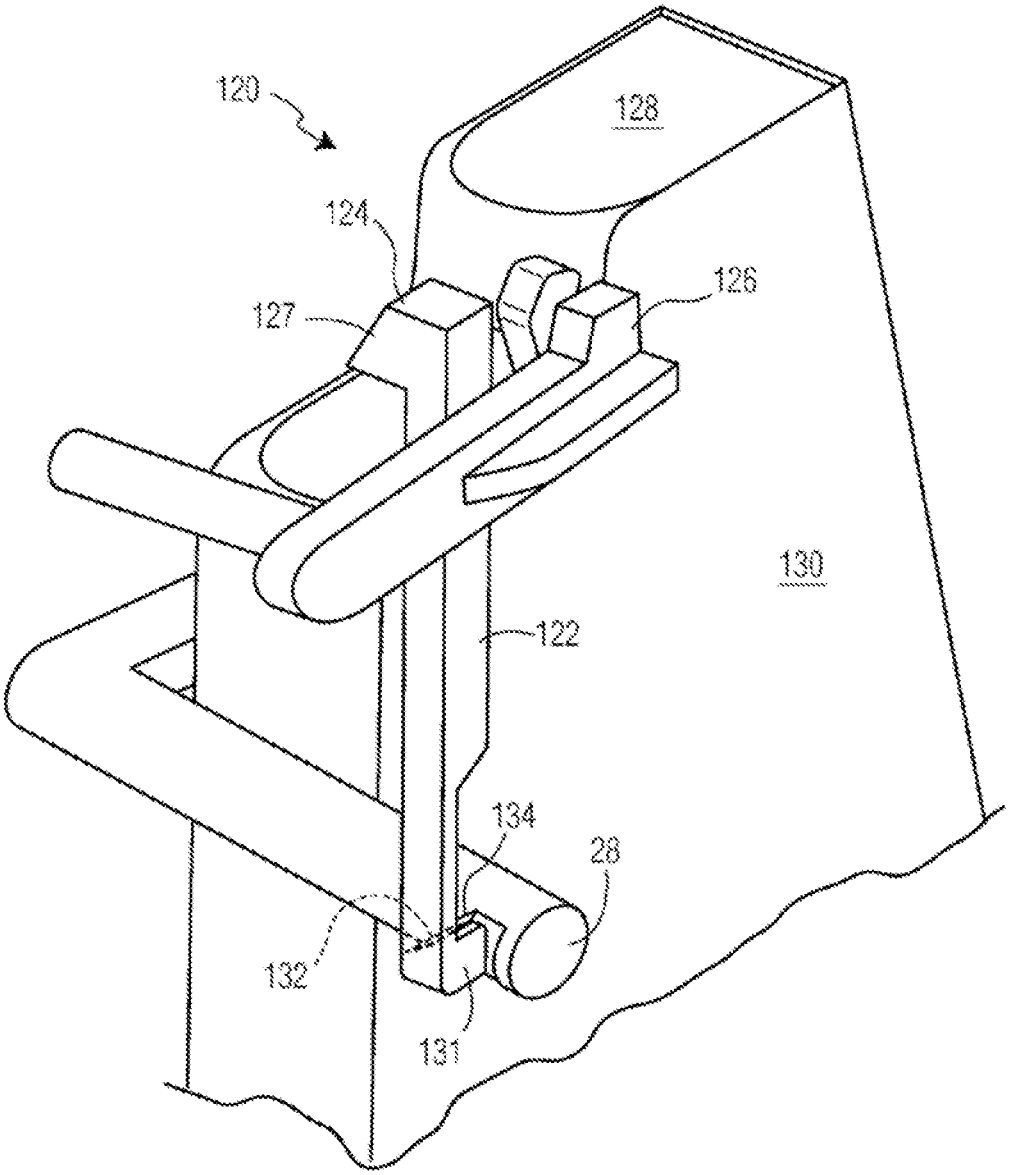
FIG. 9 is a perspective view of the magazine release components of an example of a semiautomatic handgun, showing these components interacting with a magazine on which the follower is depressed.
Figure 10:
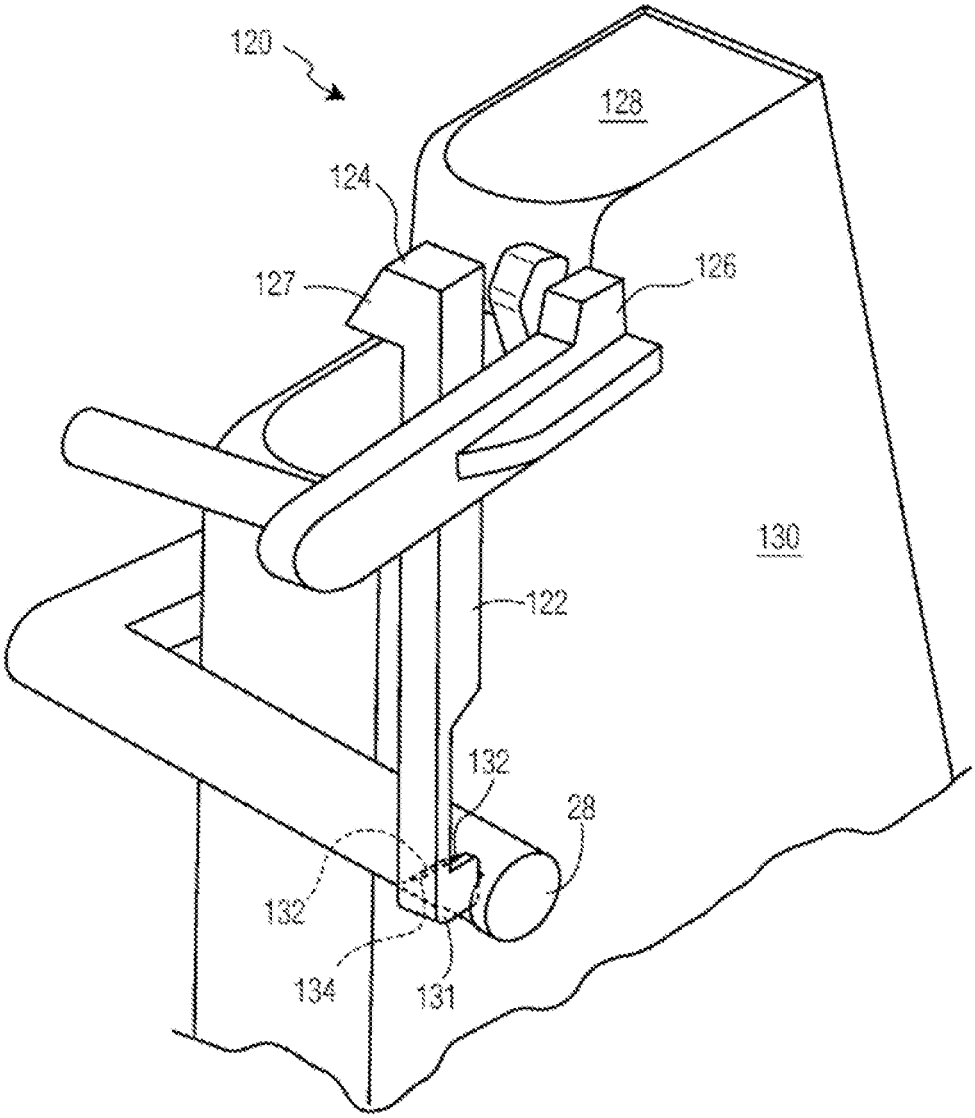
FIG. 10 is a perspective view of the magazine release components of FIG. 9, showing these components interacting with a magazine on which the follower in its uppermost position.
Figure 11:
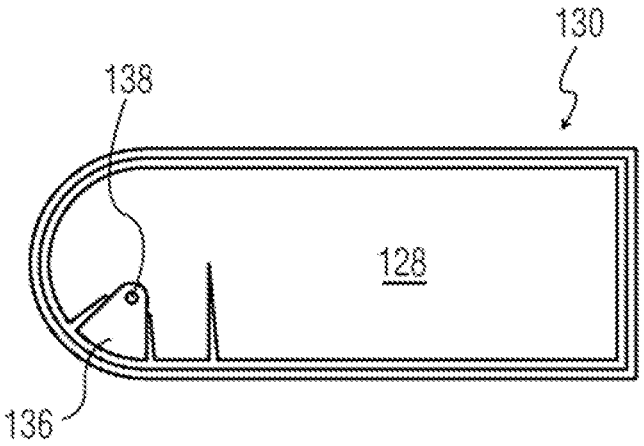
FIG. 11 is a top plan view of a magazine and magazine follower for a semiautomatic handgun.
Figure 12:
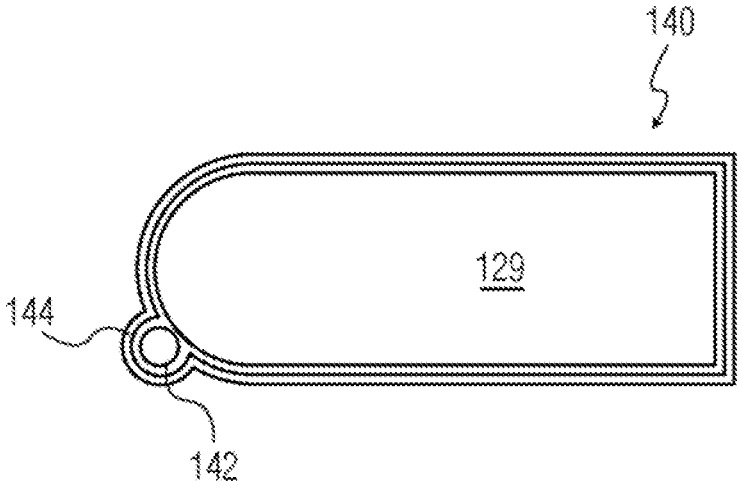
FIG. 12 is a top plan view of another example of a magazine for a semiautomatic handgun.

Referring specifically to FIGS. 9-11, one example of an automatic magazine release 120 is illustrated. The automatic magazine release 120 includes a magazine release actuator 122, having a top end 124 disposed adjacent to the slide stop 126. The top end 124 of the magazine release actuator 122 includes a lug 127 that is structured to engage a follower 128 of the magazine 130. The bottom end 131 defines a ramped surface 132 that is structured to engage a corresponding ramped surface 134 defined on the magazine release 28. Although the illustrated example shows the actuator 122 operating separately from the slide stop 126, those skilled in the art will recognize from the description herein that the actuator 122 could be operatively connected to the slide stop 126 so that the raising of the slide stop 126 will also raise the actuator 122. The operative connection between the actuator 122 and follower 128 can therefore be established either directly or indirectly through the slide stop 126.

FIG. 9 shows the position of the magazine release actuator 122 whenever the firearm 10 does not contain a magazine 130, or a loaded magazine 130 is in place. Once the last cartridge in the magazine 130 is fired and ejected, the follower 128 engages the lug 127, raising the magazine release actuator 122 at the same time as it raises the slide stop 126, to the position of FIG. 10. As the magazine release actuator 122 moves from the position of FIG. 9 to the position of FIG. 10, the ramped surface 132 engages the ramped surface 134, moving the magazine release 28 from left to right, in the same manner as if the magazine release 28 had been engaged by the users thumb. The right side of the magazine release 28 engages the notch 107 in the magazine 130 to retain the magazine 130 within the firearm 10. Movement of the magazine release 28 from left to right will disengage the magazine release 28 from the notch 107 to release the magazine 130, causing it to drop free from the pistol 10. Once the magazine 130 is released, the spring of the magazine release 28 returns the magazine release 28 to its default position, causing the corresponding ramped surfaces 132, 134 to bring the magazine release actuator 122 back to the position of FIG. 9. An additional spring biasing the magazine release actuator 122 downward may also be used for this purpose if desired.

FIG. 11 illustrates an example of a follower 128 that permits the selective activation or deactivation of the automatic magazine release 120. The follower 128 includes a paddle 136 that is pivotally secured to the follower 128 by the pivot 138. When the paddle 136 is in the position shown in FIG. 11, it will strike the lug 127 of the magazine release actuator 122. Pivoting the paddle 136 away from this position will deactivate the automatic magazine release 120.

FIGS. 12-15 illustrate another example of an automatic magazine release 140. The automatic magazine release 140 includes all of the components of FIGS. 9-10, with the additional components described below. While the example of FIGS. 9-10 depends on balancing the strength of the magazine spring with the strength of the magazine release spring so that the magazine spring will have sufficient strength to actuate the magazine release through the movement of the actuator 122, the example of FIGS. 12-15 utilizes a separate release actuator spring assembly 142 to bias the actuator 122 upward. The spring assembly 142 is contained within a tube 144 defined within, or outside of the magazine 146. The tube 144 contains a spring 148. A base 150 is disposed below the spring 148. The base 150 includes a lug 152 that is structured to fit within a channel 154. The channel 154 includes a lower end 156, and an upper end 158 at which a ledge 160 is defined. When the base 150 is within the lower end 156 of the channel 154 (FIG. 13), the spring 148 is uncompressed, and the spring assembly 142 is therefore deactivated. Pushing the base 150 upward so that the lug 152 rests on the ledge 160 compresses the spring 148 (FIG. 14), thereby activating the spring assembly 142. In some examples, the channel 154 may be defined so that the lug 152 penetrates the channel 154 so that a shooter may manipulate the base 150 by pushing upward or downward on the lug 152. In other examples, the channel may not penetrate completely through the tube 144, so that a tool may be inserted into the bottom of the tube 144 to manipulate the base 152.

Figure 13:
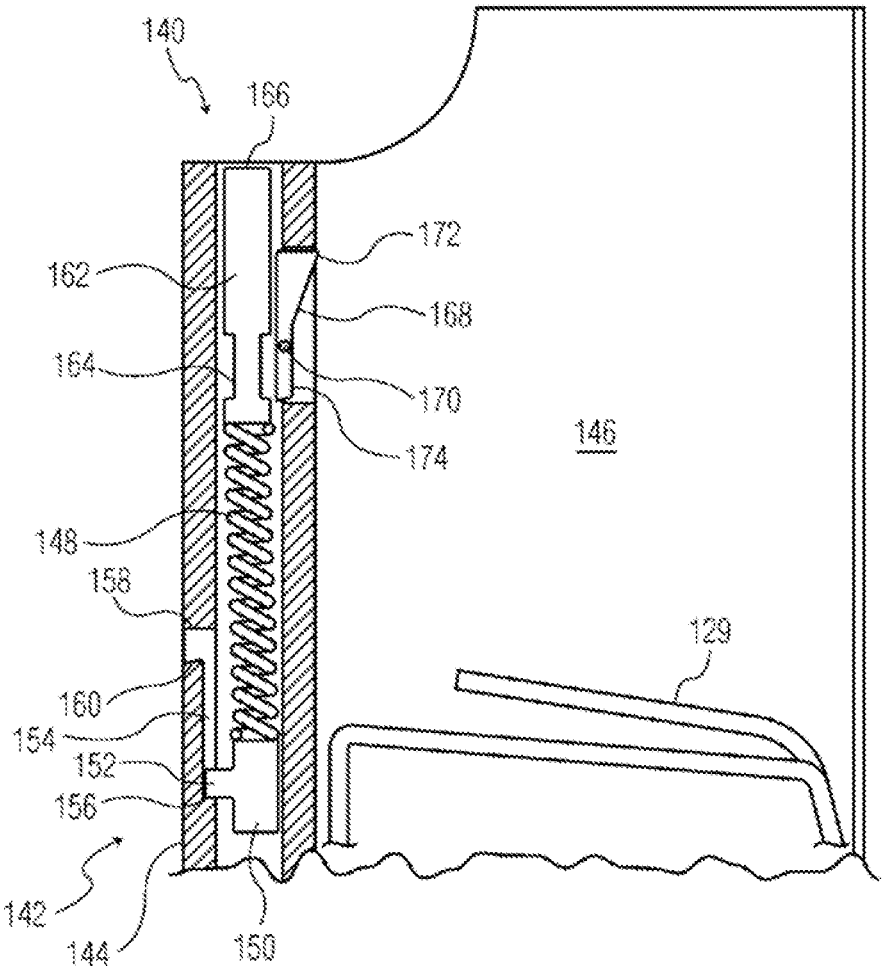
FIG. 13 is a left side elevational view of a magazine for a semiautomatic handgun, showing a magazine ejection spring deactivated.
Figure 14:
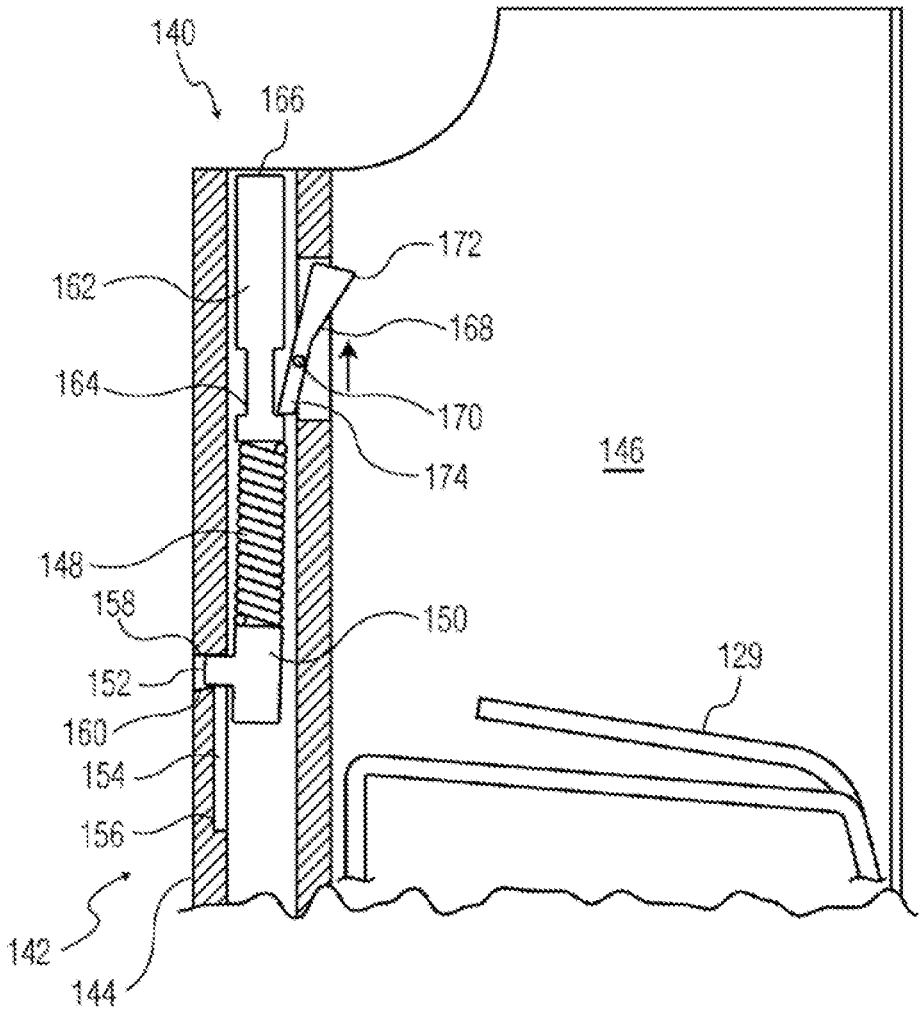
FIG. 14 is a left side elevational view of a magazine for a semiautomatic handgun, showing a magazine ejection spring compressed.
Figure 15:
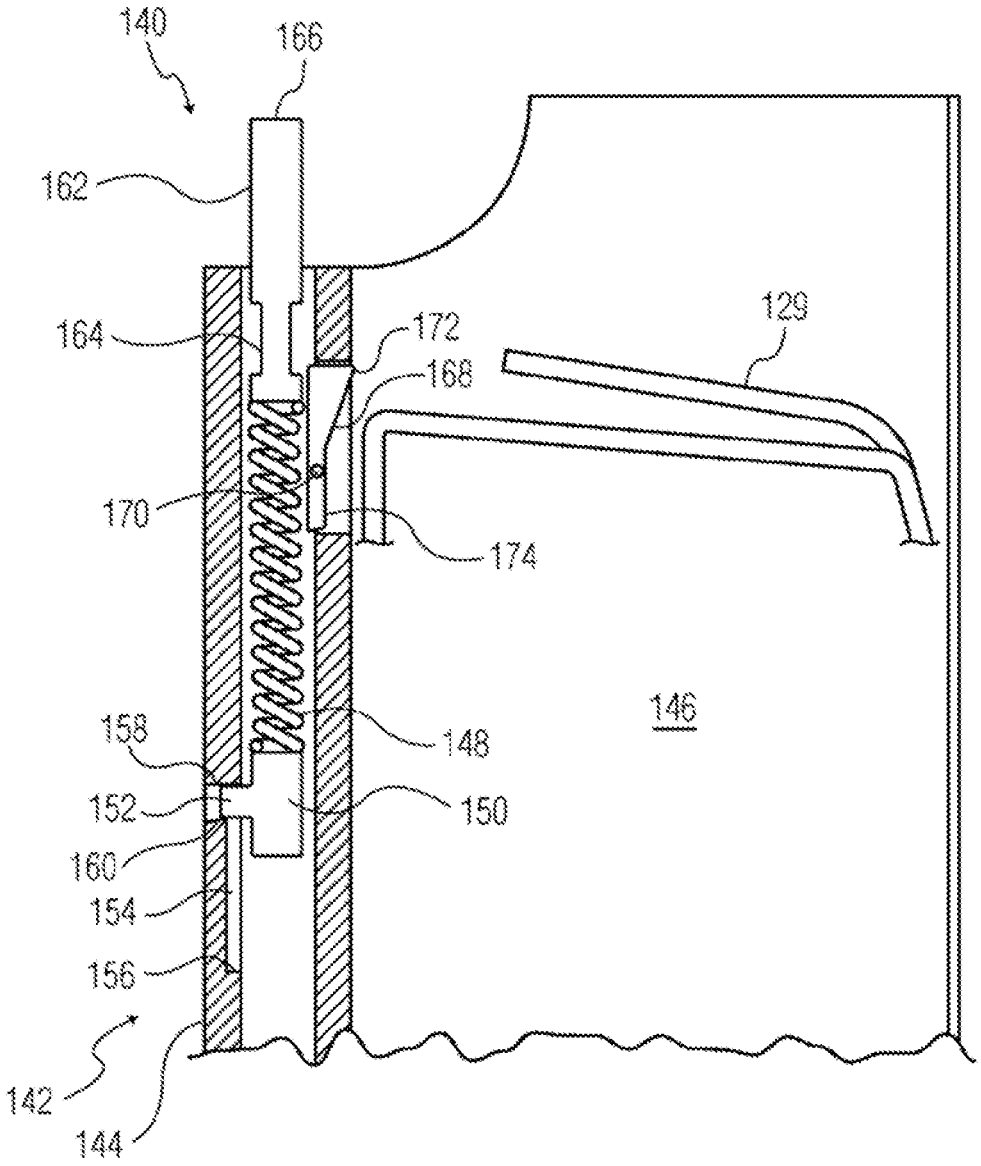
FIG. 15 is a left side elevational view of a magazine for a semiautomatic handgun, showing a magazine ejection spring upon ejecting the magazine.

A head 162 is disposed above the spring 148. The head 162 includes an engagement surface 164 about its lower periphery. The upper end 166 of the head 162 is structured to engage the lug 127 of the actuator 122. A lever 168 is pivotally secured at pivot 170 to the tube 144. The lever 168 includes a follower engaging end 172 and the head engaging end 174. The lever 168 is typically positioned as shown in FIGS. 13-14, with the head engaging end 174 engaging the surface 164 of the head 162 to hold the head 162 within the tube 144. As the follower 129 strikes the follower engaging end 172 (FIG. 15), as it would when the follower 129 rises to its uppermost position, the lever 168 pivots so that the head engaging end 174 disengages from the head 162, allowing the head 162 to strike the lug 127 of the actuator 122, thereby releasing the magazine 140. Some examples of the lever 168 may be spring biased towards the position of FIGS. 13-14.

Those skilled in the art will recognize that a base having a fixed position may be substituted for the base 150, and that the follower 128 may be substituted for the follower 129. In this case, activation or deactivation of the automatic magazine release mechanism would be by movement of the paddle 136 rather than the base 150.

Referring back to FIGS. 2-3, in the event that a disassembly tool 74 is required either for routine disassembly for cleaning, or detailed disassembly, the disassembly tool 74 may be stored within the handgun 10. In the illustrated example of the handgun 10, the disassembly tool 74 is stored within a receptacle 76 defined within a lower rear portion of the grip portion 14 of the frame 12. Other examples of the handgun 10 may store the disassembly tool 74 in other locations, for example, in other locations within the grip portion 14, or other locations on the frame 12.

Figure 4:
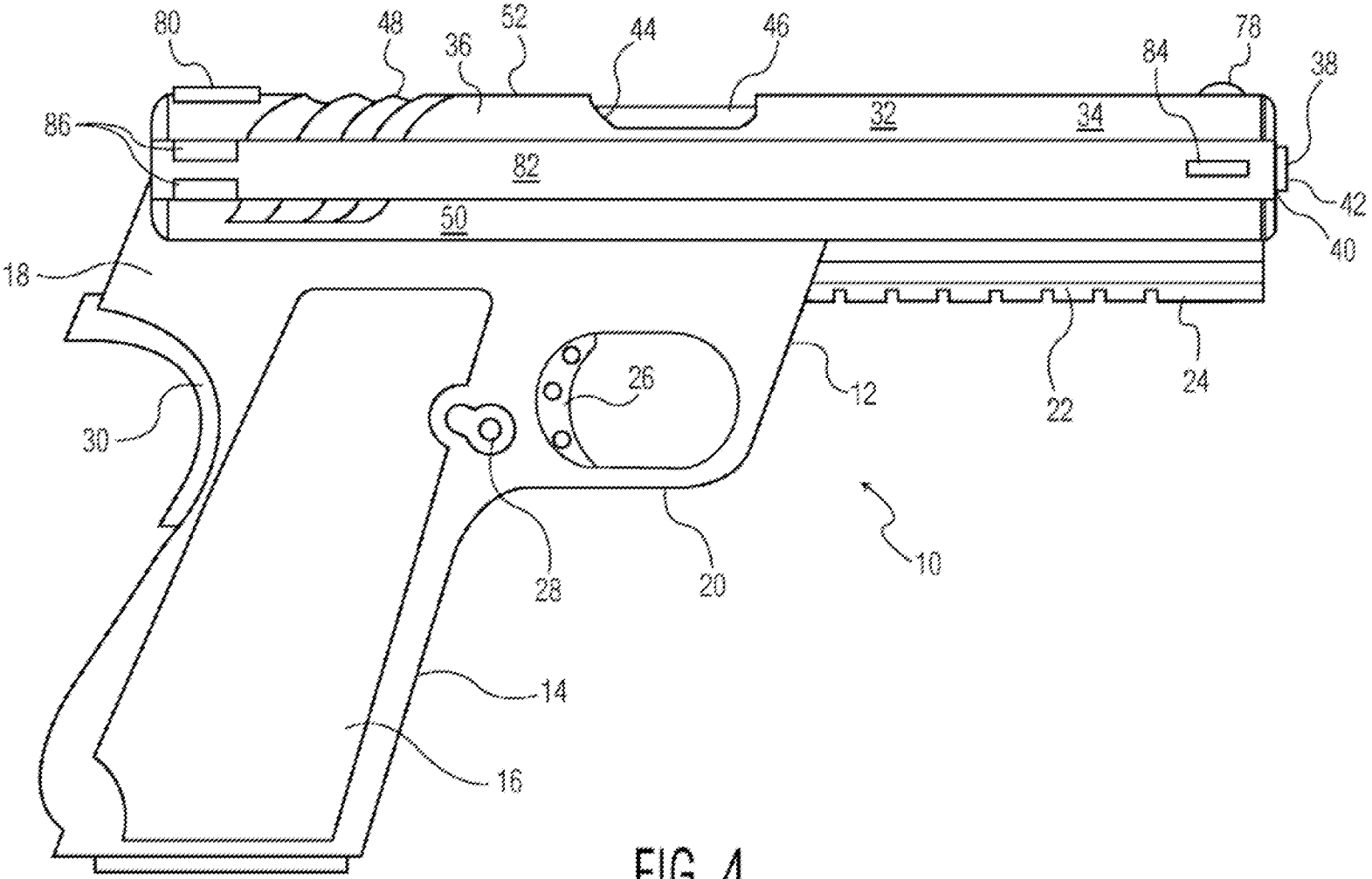
FIG. 4 is a right side elevational view of a semiautomatic handgun.
Figure 5:
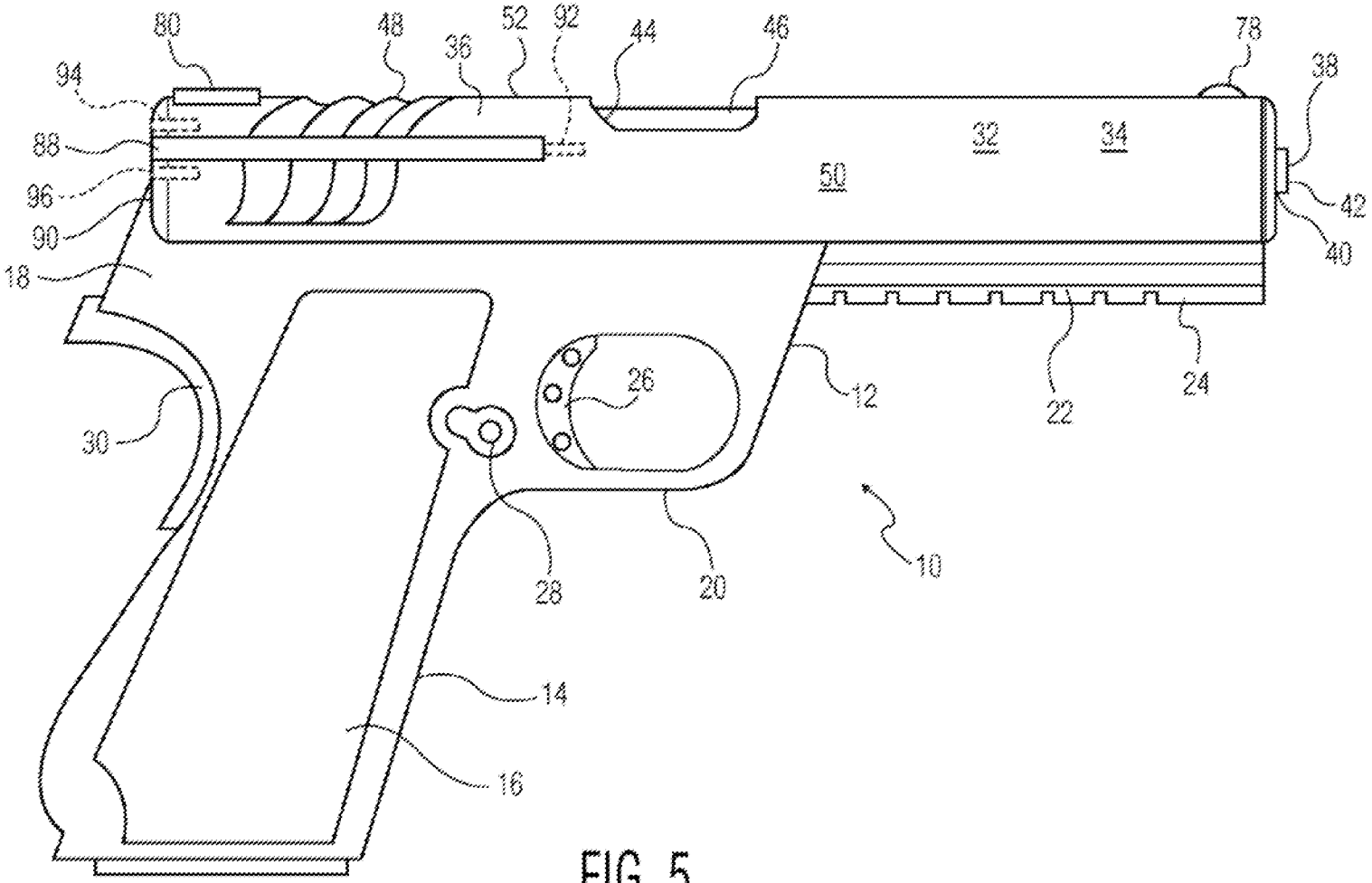
FIG. 5 is a right side elevational view of a semiautomatic handgun.

Referring to FIGS. 4-5, a unique sight configuration is illustrated. The handgun 10 includes a conventional front sight 78 and rear sight 80, which may be of any conventional type. The front sight 78 and rear sight 80 may in some examples be secured to the top 52 of the slide 32 in a manner that permits replacement with alternative front and/or rear sights, using any presently used arrangement which is known to those skilled in the art (dovetail cuts, etc.). These sights are intended to be used in a conventional manner, and are therefore not further described. However, additional sights are provided along each side 50. These additional sights are used with the handgun held in a conventional substantially vertical orientation, and provide a horizontal offset from the conventional point of aim. These sights may therefore be used when estimating the distance by which to lead a moving target. Hitting a moving target requires taking into account the speed at which the target is moving relative to the reaction time of the shooter, the mechanical time between pulling the trigger and firing the gun, and the time required for the bullet to travel to its target. The shooter will therefore generally aim a short distance ahead of the target, rather than directly at the target. Determining the correct lead, or distance ahead of the target to aim, is largely a function of skill and experience, but can be simplified by lead-estimating sighting devices.

Referring to FIG. 4, a lengthwise channel 82 is defined within each side 50 of the slide 32. The structures described herein are illustrated on the right side of the handgun 10, but the left side of the handgun 10 is a mirror image of the right side. A front sight 84 is disposed within a forward portion of the channel 82, relatively close to the muzzle 42. A rear sight 86 is disposed in a rear portion of the channel 82, in proximity to the rear sight 80. The illustrated example of the front sight 84 and rear sight 86 are of a post front, U-notch rear configuration, but other configurations, for example, an aperture rear sight, or a V-notch rear sight combined with a rounded front sight, may be used. Regardless of the sight configuration used, the front sight 84 and rear sight 86 will, in some examples, be contained entirely within, or will not substantially protrude outward from, the channel 82. Avoiding substantial protrusion of the sights 84, 86 from the channel 82 resists interference of the sights 84, 86 with standard holsters. The sights 84, 86 may optionally include tritium inserts, fiber optic inserts, colored surfaces, gold beads, or other visibility enhancements which are well known to those skilled in the art.

Referring to FIG. 5, an alternative additional sight configuration is illustrated. In this configuration, a lengthwise channel 88 extends from the rear face 90 of the slide 32. In the illustrated example, the channel 88 extends to a position in proximity to, but rearward of, the ejection port 44. Depending on the configuration of the slide 32, other lengths for the channel 88 may be used. A forward visibility enhancer 92 is placed at the forward end of the channel 88, effectively forming a front sight, so that the forward visibility enhancer 92 may be viewed by the shooter while looking at the slide's rear face 90. At least one other visibility enhancer is disposed at the rear of the channel 88, effectively forming a rear sight, so that it may be viewed by a shooter looking at the slide's rear face 90. In the illustrated example, a pair of rear visibility enhancers 94, 96 are placed above and below the channel 88, respectively. Preferred visibility enhancers 92, 94, 96 are tritium inserts, but other visibility enhancers, such as fiber optic tubes, colored dots, or gold beads may alternatively be used. A shooter may align the additional sight of FIG. 5 by visually aligning the visibility enhancers 92, 94, 96 so that they form a vertical line, with equal space between the visibility enhancers 92, 94, 96.

A shooter may therefore selectively use either the conventional sights 78, 80 to engage stationary targets or some moving targets, or may elect to use the additional sights of FIGS. 4-5 to engage moving targets. When the sights 84, 86 or the visibility enhancers 92, 94, 96 are aligned, the dimensions and locations of the sights 84, 86 or the visibility enhancers 92, 94, 96 relative to each other will be selected to indicate a point that is horizontally offset from the normal point of aim. This horizontal offset can assist the shooter in determining the proper distance by which to lead a moving target in order to hit that target.

The present invention therefore provides a handgun having unique improvements over prior handguns. Some examples of the handgun 10 include an improved cycling mechanism combining the advantages of a tilt barrel system with the compactness of a recoil spring that is wrapped around the barrel. Other examples of the handgun 10 include an automatic magazine release that is actuated upon discharge of the last cartridge in the magazine, thereby speeding the reloading process. Still other examples of the handgun 10 include a disassembly tool stored within the handgun 10. Further examples of the handgun 10 include grasping grooves on top of the slide as well as along the sides of the slide, thereby facilitating manipulation of the slide with only one hand, and without limiting rear sight design. Still other examples of the handgun 10 include sight systems along the sides of the handgun 10 to facilitate the determination of the proper distance by which to lead a moving target. Further examples of the handgun 10 provide a means of determining an approximate number of cartridges within the magazine without removing the magazine, even in poor lighting conditions.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

[1. A semiautomatic handgun, comprising:

a detachable magazine for holding a plurality of cartridges, the magazine including a generally tubular body defining a closed end, an open end, and a spring-biased follower slidably disposed within the body, the follower being structured to push cartridges towards the open end of the magazine;

a frame that is structured to detachably retain the magazine;

a magazine release mechanism that is structured to automatically release the magazine from the pistol upon the discharge of a last cartridge from the magazine; the magazine release mechanism comprising:

a magazine release having a magazine engaging portion and defining a ramped surface, the magazine release being movable between a magazine retaining position wherein removal of the magazine is resisted and a magazine releasing position wherein removal of the magazine is permitted; and a magazine release actuator having a first end and a second end, the second end defining a ramped surface structured to engage the ramped surface of the magazine release, the first end being structured to operatively engage the magazine follower when the follower is adjacent to the open end of the magazine.]

[2. The semiautomatic handgun according to claim 1, wherein the magazine release is a magazine release button.]

3. [The] *A* semiautomatic handgun[ according to claim 1], *comprising a detachable magazine for holding a plurality of cartridges, the magazine including a generally tubular body defining a closed end, an open end, and a spring-biased follower slidably disposed within the body, the follower being structured to push cartridges towards the open end of the magazine; a frame that is structured to detachably retain the magazine; a magazine release mechanism that is structured to automatically release the magazine from the pistol upon the discharge of a last cartridge from the magazine; the magazine release mechanism comprising: a magazine release having a magazine engaging portion and defining a ramped surface, the magazine release being movable between a magazine retaining position wherein removal of the magazine is resisted and a magazine releasing position wherein removal of the magazine is permitted; and a magazine release actuator having a first end and a second end, the second end defining a ramped surface structured to engage the ramped surface of the magazine release, the first end being structured to operatively engage the magazine follower when the follower is adjacent to the open end of the magazine, the semiautomatic handgun* further comprising a paddle that is pivotally secured to the magazine follower, the paddle being rotatable between a first position wherein the paddle engages the magazine release actuator when the follower is adjacent to the open end of the magazine, and a second position wherein the paddle does not engage the magazine release actuator when the follower is adjacent to the open end of the magazine.

[4. The semiautomatic handgun according to claim 1, wherein the magazine further comprises a spring assembly disposed at one side of the body, the spring assembly being structured to bias the magazine release actuator in the direction of the actuator's first end upon the follower reaching a position adjacent to the open end of the magazine.]

5. [The] *A* semiautomatic handgun[ according to claim 4, wherein], *comprising a detachable magazine for holding a plurality of cartridges, the magazine including a generally tubular body defining a closed end, an open end, and a spring-biased follower slidably disposed within the body, the follower being structured to push cartridges towards the open end of the magazine; a frame that is structured to detachably retain the magazine; a magazine release mechanism that is structured to automatically release the magazine from the pistol upon the discharge of a last cartridge from the magazine; the magazine release mechanism comprising: a magazine release having a magazine engaging portion and defining a ramped surface, the magazine release being movable between a magazine retaining position wherein removal of the magazine is resisted and a magazine releasing position wherein removal of the magazine is permitted; and a magazine release actuator having a first end and a second end, the second end defining a ramped surface structured to engage the ramped surface of the magazine release, the first end being structured to operatively engage the magazine follower when the follower is adjacent to the open end of the magazine, the magazine further comprising a spring assembly disposed at one side of the body, the spring assemby being structured to bias the magazine release actuator in the direction of the actuator's first end upon the follower reaching a position adjacent to the open end of the magazine,* the spring assembly [comprises:] *comprising* a head disposed adjacent to the open end of the magazine; a release actuator spring operatively engaging the head; a release lever structured to hold the head in a first position wherein the release actuator spring is compressed, and to release the head upon the follower reaching a position adjacent to the open end of the magazine.

6. The semiautomatic handgun according to claim 5, further comprising a base slidably disposed within the spring assembly, operatively engaging the release actuator spring opposite the head, the base being structured to be secured in a first position wherein the release actuator spring is substantially uncompressed, and a second position wherein compression of the release actuator spring is facilitated.

7. The semiautomatic handgun according to claim 6: further comprising a spring assembly housing, the housing defining a slot therein, the slot having a first end and a second end, the second end defining a ledge; and wherein the base includes a lug that is structured to engage the slot; whereby the release actuator spring is uncompressed when the base is adjacent to the first end of the slot, and the release actuator spring may be compressed when the lug engages the ledge at the second end of the slot.

[8. The semiautomatic handgun according to claim 1, wherein the magazine release mechanism may be selectively actuated either automatically upon the discharge of the last cartridge in the magazine, or utilizing a manually operated magazine release.]

* * * * *